United States Patent Office 2,910,349
Patented Oct. 27, 1959

2,910,349

METHOD FOR TITRATING CALCIUM

Wendell Reeder and James C. Patton, Dallas, Tex.

No Drawing. Application November 2, 1956
Serial No. 619,921

3 Claims. (Cl. 23—230)

This invention relates to the provision of a new indicator for titrating calcium in the presence of magnesium with (ethylenedinitrilo) tetraacetate. In another aspect, the invention relates to the method of synthesizing said indicator, preferably in the form 2-hydroxy-1-(2-hydroxy-4-sulfo-1-naphthylazo)-3-naphthoic acid.

The determination of calcium and magnesium has been carried out by titration with standard solutions of disodium dihydrogen (ethylenedinitrilo) tetraacetate using Eriochrome Black T,

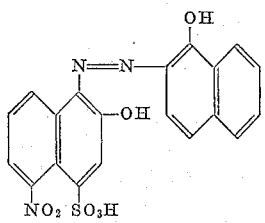

as the indicator. Titration for the separate determination of calcium and magnesium by precipitating the calcium as the oxalate, and then titrating the magnesium after filtration is also utilized. The latter method for calcium and magnesium has been used as in studies of dolomites and limestones. A sulfite separation method for the determination of magnesium when calcium is present is also known. It can also be shown that calcium can be titrated in the presence of magnesium when ammonium purpurate is used as the indicator as where, in tests relating to water analysis for example, calcium determination has been carried out using ammonium purpurate as the indicator. Similarly, calcium has been determined in biological fluids with (ethylenedinitrilo) tetraacetate using ammonium purpurate as the indicator.

The principal difficulty in determining calcium or magnesium separately by the known compleximetric methods is indistinct end points and/or the necessity of separating the metals prior to titration. Thus a method which gives a good visual end point and permits a rapid titration of calcium in the presence of magnesium has not heretofore been known.

In accordance with the present invention there is made possible the direct titration of calcium in the presence of magnesium. Further, by the present invention, a new indicator may be synthesized which in use provides a sharp color change from wine red to pure blue when calcium is titrated with (ethylenedinitrilo) tetraacetate at relatively high pH values.

The accurate determination of calcium in a variety of samples including water, limestone, salt, blood serum, milk and urine and the like with no interference from magnesium is thus made possible.

More particularly, in accordance with the present invention there is provided a new indicator, in a preferred form, 2-hydroxy-1-(2-hydroxy-4-sulfo-1-naphthylazo)-3-naphthoic acid. Further in accordance with the present invention there is provided a method of synthesizing said indicator by coupling diazotized 1-amino-2-naphthol-4-sulfonic acid with 2-hydroxy-3-naphthoic acid.

The method of the present invention in a preferred embodiment comprises diazotizing 1-amino-2-naphthol sulfonic acid in the absence of light to form a diazo compound, and thereafter in the continued absence of light and in the presence of excess caustic coupling the diazo compound to 2-hydroxy naphthoic acid.

In general, starting compounds for synthesizing the present indicator may comprise polynuclear aromatic hydrocarbons, either naphthoic acid or polynuclear sulfonic acid. The compound produced may broadly be designated as one having the formula $R_1—N=N—R_2$, where $R_1$ is a polycyclic aromatic hydrocarbon radical having one hydrogen atom in the 2 position substituted by a hydroxy radical, and $R_2$ is a polycyclic aromatic hydrocarbon radical having one hydrogen atom in the 2 position substituted by a hydroxy radical and further substituted in other positions by radicals selected from the group consisting of the carboxyl and sulfonic radicals, i.e.; substituted by a hydroxyl radical and having carboxyl and/or sulfonic radicals in other positions of the polycyclic hydrocarbon radical.

It has been found that the total calcium in liquid samples may be determined in a simple and reliable manner in the presence of magnesium by adjusting the pH value of a sample of fluid to be tested to a predetermined level which level is sufficiently high, in excess of about 11, as to insure quantitative precipitation of magnesium as magnesium hydroxide and thereafter titrating with (ethylenedinitrilo) tetraacetate using 2-hydroxy-1-(2-hydroxy-4-sulfo-1-naphthylazo)-3-naphthoic acid. Although magnesium hydroxide precipitate may be present during such titration procedures, the chelating solution will not react with the magnesium until all free calcium as well as all of the calcium which has been complexed by the indicator have been chelated by (ethylenedinitrilo) tetraacetate. The addition of a caustic prior to the addition of the indicator prevents magnesium salts from forming a lake with the indicator as the pH increases.

The colored complex formed with the indicator and calcium is adsorbed on any magnesium hydroxide precipitate but nevertheless a sharp end point is possible because the chelating agent has contact with the colored complex. A sharp end point is therefore obtained in the presence of magnesium hydroxide precipitate.

One method of preparing the indicator is as follows:
Preferably a starting component, 1-amino-2-naphthol-4-sulfonic acid

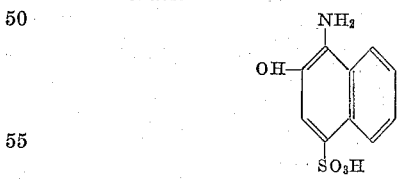

is treated in a first step by diazotizing the same in the absence of light to produce

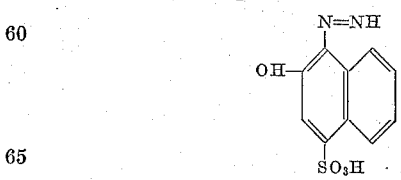

By way of example this component in one instance was prepared by stirring a mixture of 23.9 grams of 1-amino-2-naphthol-4-sulfonic acid and 100 ml. of water at 20° C. in a 400 ml. beaker. There was then added as a catalyst 0.2 gram of cupric sulfate pentahydrate and 23 ml. of a 30% solution of sodium nitrite to the mixture.

Stirring of the mixture was continued for 45 minutes and the solution was then filtered into a dropping funnel. A dark room safe light was used to aid in the manipulations.

A second starting component of the reaction comprises 2 hydroxy-3-naphthoic acid which expressed structurally is of the form

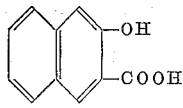

Continuing the operation which is, in part, detailed above, a suspension of 18.8 grams of powdered 2-hydroxy-3-naphthoic acid and 50 ml. of water in a 600 ml. beaker was prepared. There was then added, while stirring, 35 ml. of a 50% solution of potassium hydroxide. When complete solution was obtained, the mixture was cooled to about 20° C.

After the solution was cooled, the diazotized 1-amino-2-naphthol-4-sulfonic acid was added to the naphthoic acid solution dropwise accompanied by constant stirring. After all of the diazonium salt had been added, stirring was continued for about 15 minutes. At this point the mixture was such that it could be exposed to ordinary light without decomposition.

There were then added to the mixture 50 grams of cracked ice. At this stage the mixture was a dark blue solution. Thereafter, 50 ml. of concentrated hydrochloric acid was added slowly accompanied by constant stirring. The solution was then filtered by suction and the precipitate was washed with hydrochloric acid of about 10% strength until the filtrate was light red in color. The precipitate was the desired indicator, namely 2-hydroxy-1-(2-hydroxy-4-sulfo-1-naphthylazo)-3-naphthoic acid, or expressed structurally,

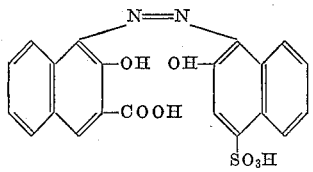

The nitrogen bonds in the above group are the basis for a blue coloring of the indicator whereas the hydroxyls adjacent the nitrogens provide a mechanism for complexing calcium. In contrast to Eriochrome Black T, the carboxy radical is strongly bound so that the indicator functions and is stable at the high pH values necessary to titrate calcium in the presence of magnesium. The precipitate was dried as on a steam bath until it could be reduced to a fine powder. The powdered material was then dried at about 100° C. for three or four hours.

The indicator in powder form preferably is made more readily useable by dilution to about 1/100 strength as by triturating about 0.5 gram thereof with 50 grams of reagent grade sodium sulfate, sodium chloride, or potassium chloride until the indicator is evenly distributed thereon.

It has also been found that the indicator may be prepared for alternate use by dissolving the powdered dye in formamide. In contrast, Eriochrome Black T decomposes in formamide presumably by oxidization and/or polymerization and thus lacks the significant qualities of the present indicator. For example, 0.5 gram of the powdered indicator may be dissolved in 50 milliliters of formamide to form an indicator solution of strength comparable to the indicator diluted in powder form as above described.

The indicator thus diluted may be used in titrating for calcium as follows:

Pipet duplicate aliquots of the unknown sample into 250 ml. wide mouthed Erlenmeyer flasks and dilute to about 50 ml. Add 4 ml. of 8 normal potassium hydroxide solution to the flask and mix to raise the pH of the solution preferably to 12. A precipitate of magnesium hydroxide may be noted at this point. Allow the flask to stand for 3 to 5 minutes with occasional swirling. Add about 30 mg. each of potassium cyanide and hydroxylamine hydrochloride and swirl the flask until the reagents have dissolved. Add 0.1 gram of powdered diluted indicator (or two drops of the diluted liquid indicator) and titrate with standard (ethylenedinitrilo) tetraacetate solution to the pure blue end point.

With reference to the standard titrant above referred to, one ml. of 0.0200 N (ethylenedinitrilo) tetraacetate solution is equivalent to 0.4008 mg. of calcium. Thus the quantity of calcium present in the unknown solution may readily be calculated.

A blank titration should be made replacing the sample with distilled water as a precaution to make certain that the reagents used were free of calcium and to thus give assurance that the results from the foregoing procedures may be relied upon.

A tungsten light source placed near the titration flask improves the end point of the direct calcium titration principally because the red complex of the indicator and calcium is greatly intensified.

As is well understood in the art, it may be desirable to repeat the titration with the aliquot that was placed in the second flask in order to obtain a sharper end point and thus to obtain a more precise measure of calcium. There will first be added to the second flask an amount of titrant equal to 1 milliliter less than the amount that was required to reach the end point. Thereafter 4 milliliters of 8 normal potassium hydroxide is added to raise the pH. The titration is then completed and is directly related to the amount of calcium present.

In accordance with a modified method of synthesizing the indicator the diazonium salt of the sulfonic acid is produced in order to eliminate such unwanted components as copper sulfate, sodium hydroxide and other byproducts. More particularly, the diazotized sulfonic acid may be mixed with a NaCl solution. The solution is filtered to remove the precipitate, the sodium salt of the diazo oxide, i.e.

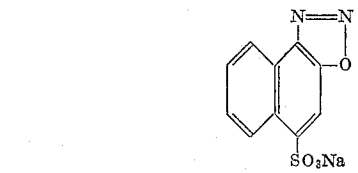

The precipitate is then dissolved in distilled water and coupled as above explained to the naphthoic acid.

While the foregoing has considered only naphthalene compounds as starting constituents it should be understood that anthracene may also be employed. Therefore most polynuclear compounds will be suitable. Further, the salts may be employed as well as the acids. The carboxy radical may occupy positions 4, 5, 6, 7, or 8 in the naphthalene ring rather than position 3 and still have utility in that it would be strongly bound and lend stability at high pH values.

What is claimed is:

1. A method of determining calcium in solution in the presence of magnesium which comprises titrating a measured amount of the solution with a solution of standard (ethylenedinitrilo) tetraacetate in the presence of a known concentration of an indicator of the general formula $R_1$—N=N—$R_2$ where $R_1$ is a naphthalene hydrocarbon radical having one hydrogen atom substituted by a carboxy radical and one hydrogen atom in the 2 position substituted by a hydroxyl radical, and $R_2$ is a naphthalene hydrocarbon radical having one hydrogen atom in the 2 position substituted by a hydroxyl radical and one hydrogen atom in the 3 position substituted by a radical selected from the group consisting of the carboxyl and sulfone radicals.

2. A method of determining calcium in solution in the presence of magnesium which comprises titrating a measured amount of the solution with a solution of (ethylenedinitrilo) tetraacetate in the presence of 2-hydroxy-1-(2-hydroxy-4-sulfo-1-naphthylazo)-3-naphthoic acid, to a color change indicating stoichiometric relationship.

3. The method according to claim 2 in which the pH of said measured amount of the solution is raised to at least 11.

References Cited in the file of this patent

UNITED STATES PATENTS

| | | |
|---|---|---|
| 2,559,331 | Widmer et al. | July 3, 1951 |
| 2,570,085 | Widmer et al. | Oct. 2, 1951 |
| 2,583,890 | Schwarzenbach | Jan. 29, 1952 |
| 2,599,697 | Conklin | June 10, 1952 |
| 2,720,517 | Kartaschoff et al. | Oct. 11, 1956 |

OTHER REFERENCES

Groggins: "Unit Processing in Organic Chem.," 2nd ed., 1938, pages 136 to 141.

Gehrke et al.: "Anal. Chem.," vol. 26, 1954, pages 1944 to 1948.